United States Patent Office 3,712,888
Patented Jan. 23, 1973

---

3,712,888
BIS-PYRIDOXAZOLE-STILBENE DERIVATIVES FOR OPTICAL BRIGHTENING
Henry Xavier Kaempfen, Hillsboro Township, Somerset County, N.J., assignor to American Cyanamid Company, Stamford, Conn.
No Drawing. Original application Jan. 27, 1969, Ser. No. 794,378. Divided and this application Dec. 14, 1970, Ser. No. 98,120
Int. Cl. C09b 23/00
U.S. Cl. 260—240 CA                2 Claims

ABSTRACT OF THE DISCLOSURE

A novel class of heterocyclic stilbene derivatives have outstanding properties as optical brightening agents. The new compounds are bis-pyridoxazole-stilbenes of the formula:

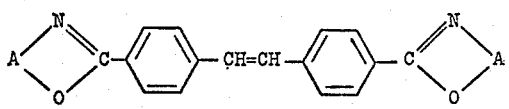

where each A represents a pyrido ring attached through two adjacent carbon atoms thereof to N and O, respectively, and where the pyrido rings and the phenylene rings may be substituted. New intermediates for the preparation of the brightener compounds are bis-amides of the formula:

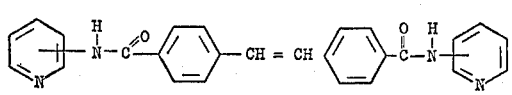

wherein each pyridine ring carries a halo or a hydroxyl radical in a position ortho to the point of attachment of the

bond and may be further substituted and wherein the phenylene rings may also be substituted.

---

This application is a divisional of application Ser. No. 794,378, filed Jan. 27, 1969.

This invention relates to new and useful heterocyclic stilbene derivatives. More particularly, the invention relates to a new class of heterocyclic stilbenes, the bis-pyridoxazole-stilbenes which are particularly useful as brighteners or optical bleaching agents.

Generally, while many brightening agents are available for a variety of purposes, they are often unsuitable for specialized applications. A particular illustration of a specialized application would arise in the preparation of synthetic polymeric substrates, such as fibers, films and the like, in which the brightening agent would be applied by melt brightening or a dope dyeing technique (or before fabricating a formed article). Such a process would entail incorporating the brightening agent with a precursor monomer prior to polymerization, or incorporating the agent into a dope or melt composition prior to spinning, casting or extruding such composition into films and fibers or other forms.

The most notable advantages which would be occasioned by such speciallized application are a reduction of any inherent discoloration of the polymer, as well as a brightening effect of enhanced durability and permanence since the tendency for the brightener to migrate out of the composition would be lessened. Additionally, an advantage which should be readily apparent is that the subsequent treatment of the formed substrate with brightneers can, if desired, be avoided and may even become unnecessary.

In order for the brightening agent to be effective in such a specialized application, it should have minimum self-color with a high fluorescence to achieve desirable brightening in the substrate, that is, a high-strength brightening effect. Additionally, it should have good light fastness, resistance to the effect of washing and bleaching agents, stability under the condition of processing of the melt, low migration tendency and a low sublimation tendency.

Accordingly, it is a primary object of the present invention to provide a new class of heterocyclic stilbene derivatives, the bis-pyridoxazole-stilbenes.

Another object of the present invention is to provide new brightening or optical bleaching agents.

Yet another object of the invention is to provide brightening agents which are capable of specialized application and which possess minimum self-color with a high degree of fluorescence, good light fastness, resistance to washing and bleaching agents, stability under the conditions of melt processing, low migration tendency and low sublimation tendency.

The foregoing objects are achieved by the present invention which provides a new class of heterocyclic stilbene derivatives, viz, bis(pyridoxazolyl)stilbene compounds, represented by the formula:

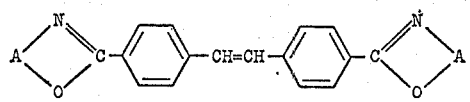

wherein A represents a pyrido ring attached through two adjacent carbon atoms thereof to the N-atom and O-atom of the oxazole ring, respectively; the pyrido rings and the phenylene rings being otherwise substituted or unsubstituted.

A preferred sub-class of compounds are those represented by the formula:

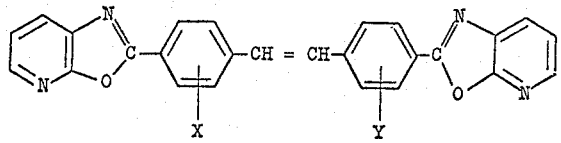

wherein the pyrido rings may carry one or more substituents selected from the group consisting of halogen, lower alkyl, carboxyl, lower carbalkoxy, carboxamido, hydroxy, cyano, lower alkoxy and phenyl; and where X and Y are members selected from the group consisting of hydrogen, lower alkyl, halogen, lower carbalkoxy, carboxamido, cyano, hydroxy and lower alkoxy.

A particularly preferred member of the new class of compounds, which is used illustratively of the whole class of compounds with respect to its preparation, properties and useful application as a brightener, is represented by the following formula:

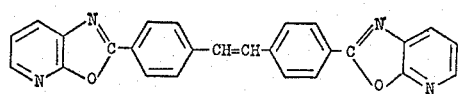

This particular compound is identified chemically as 4,4′-bis(oxazolo[5,4-b]pyridin-2-yl)stilbene; or it may also be considered as a bis(pyridoxazoyl)-stilbene derivative in which case the complete name of the particular compound would be designated as 4,4′-bis(pyrid[3,2-d]oxazol-2-yl) stilbene. For convenience, the novel compounds of the invention are designated herein as bis-pyridoxazole-stilbene derivatives.

The present invention also provides a new class of bis-amide compounds which are intermediates in the preparation of the new bis-pyridoxazole stilbene derivatives. These bisamides are represented by the formula:

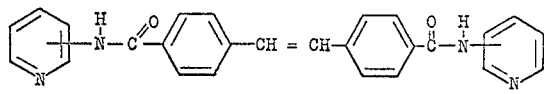

wherein each pyridine ring carries a halo or a hydroxyl radical in a position ortho to the point of attachment of the

bond and may be further substituted by a member selected from the group consisting of halogen, lower alkyl, carboxyl, lower carbalkoxy, carboxamido, hydroxy, cyano, lower alkoxy and phenyl; and where each of the phenylene rings may be substituted by a member selected from the group consisting of lower alkyl, halogen, lower carbalkoxy, carboxamido, cyano, hydroxy and lower alkoxy.

The new compounds are useful as brighteners or optical bleaching agents, particularly for specialized types of application to synthetic polymeric types of substrates. These include substrates in the form of fibers, fabrics, or films, etc., to which the brightener may appropriately be applied by disperse dye methods. They are particularly useful in those applications where the brightener may be incorporated with the precursor monomers before polymerization or where they may be incorporated into the dope or melt composition used for spinning, casting, extruding, etc. into films, fibers, or other forms.

Although the new brighteners may be applied to finished films or fabrics from detergent or textile baths, the so called "melt brightening" process, where the brightener is incorporated into the melt before spinning the fiber is an especially important application for these new compounds.

While, as aforeindicated, various types of brightener agents have been made available for many purposes, there is still a great need for new brighteners for special applications since, in general, the known brighteners are often not suitable for those special applications. There are definite advantages, of course, to the dope or melt brightening process for fibers since the brightening effect becomes much more durable and permanent than when only applied to the surface of the fiber from a detergent or textile bath as it is done originally in a textile mill operation or later in a home laundry. Also, by incorporating the brightener into the melt the later operation in the textile mill of applying the brightener is avoided. As stated above, the brightening effect is also much more durable since there is considerably less tendency for the brightener to migrate out of the composition.

The novel compounds of the invention meet the recommendations for brighteners, particularly for melt brighteners in various types of synthetic materials, such as polyesters (e.g. polyethylene terephthalate), super-polyamides, polyacrylonitrile, poly(vinylchloride), polycarbonates, polyethylene, polypropylene, etc.

In general, the amount of the brightener compound required is from about 0.005% to about 1.0% based on the weight of the brightened composition.

The compounds exhibit outstanding brightening effects when incorporated into polyester chips. Thus, when compared with a related known brightener of the bis-(benzoxazole) stilbene class, the preferred compound of the invention is definitely superior in fluorescence, sublimation, etc. A particularly surprising feature of the preferred compound is that, although it is itself yellow-colored, this self-color is lost when it is incorporated into a polyester and processed for spinning into a fiber.

The new compounds of the invention are prepared by various methods using known compounds as starting materials. A convenient method of preparation may be illustrated using the preferred compound of the invention as defined above, for an example. The first step in this preparation involves conversion of stilbene-4,4'-dicarboxylic acid to the diacid chloride by reaction with a chlorinating agent, such as thionlyl chloride. By reaction with 3-amino-2-chloropyridine, the diacid chloride is converted to the corresponding bis amide. The final product is obtained by a ring closure reaction of the bis amide.

This may be represented by the following reaction scheme:

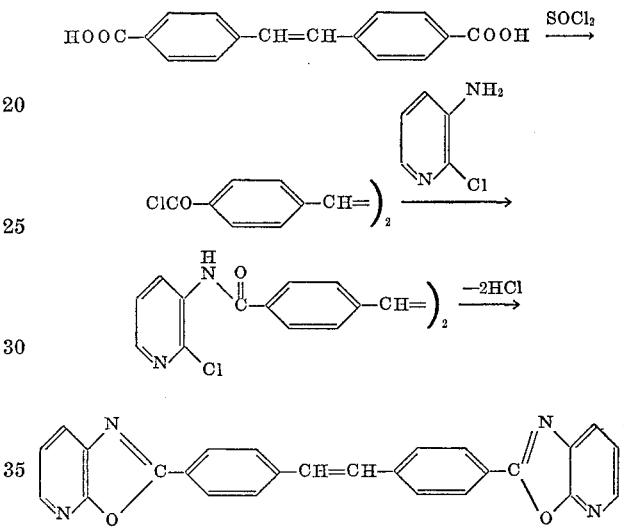

To obtain substituted compounds in this series, appropriately substituted starting materials may be used. Thus, examples of 4,4'-stilbenedicarboxylic acids which are suitable include those with substituents such as:

2,2'-dimethyl
2,2'-dichloro
2,2'-dicyano
2,2'-dimethoxy and the corresponding 3,3'-substituted derivatives.

Examples of the substituted pyridine derivatives which may be used include those with substituents such as:

4-amino-2,3-dichloro
4-amino-2,3,6-trichloro
3-amino-2,6-dichloro
2-amino-3-chloro
2-amino-3-bromo
4-amino-3-bromo
4-amino-3-bromo-5-ethyl
4-amino-3-bromo-5-methyl
4-amino-3-bromo-5-isopropyl
4-amino-3-bromo-2,6-dimethyl
3-amino-2-bromo-6-methyl
2-amino-3-bromo-5-methyl
2-amino-3-bromo-5-methyl-6-cyano
4-amino-2,3-dibromo
4-amino-3-bromo-5-carboxy
2-amino-3-bromo-5-carboxy
2-amino-3-bromo-5,6-dimethyl Another method of preparation involves the use as an intermediate of an orthohydroxamide derivative in place of the ortho-halo amido derivative in which case the final product is formed by a ring closure involving a dehydration, rather than a dehydrohologenation. This method makes certain substituted members of the class more easily accessible since certain of the ortho-hydroxyaminopyridine starting materials are easier to obtain by synthetic methods than the corresponding haloaminopyridine derivatives. The starting pyridine derivatives correspond to those listed above except that they are ortho-hydroxyamino pyridine derivatives instead of ortho-haloamino derivatives.

The invention is illustrated by the following example and tests.

EXAMPLE I (A) Preparation of 4,4'-stilbenedicarboxylic acid dichloride.—A mixture of 10 grams 4,4'-stilbenedicarboxylic acid and 120 ml. thionyl chloride is heated at the reflux temperature for about 20 hours. After chilling in an ice bath, the crystalline precipitated product is isolated by filtration and washed with hexane. The product (10.7 g.) has a melting point of 229.5° to 232° C.

(B) Preparation of N,N'-bis(2-chloro-3-pyridyl)-4,4'-stilbenedicarboxamide.—To a solution of 3.85 g. of 3-amino-2-chloropyridine in 80 ml. of chlorobenzene is added gradually with stirring at 100° C., 4.25 g. of the di-acid chloride prepared as described in A, above. The temperature is raised and the mixture stirred at the reflux temperature for eight hours. After cooling the precipitate which forms in the reaction mixture is removed by filtration, washed with chlorobenzene and benzene and dried. The product is purified by recrystallization from a solvent such as o-dichlorobenzene or chlorobenzene; the purified product has a melting point of 286° to 287.5° C. with an overall yield of 90%.

(C) Preparation of 4,4'-bis(pyrid[3,2-d]oxazol-2-yl)stilbene.—A mixture of 4.2 g. of the bisamide, prepared in B above, 9.5 g. of anhydrous cupric acetate, 1.7 g. zinc in granule form, 40 ml. of anhydrous pyridine and 160 ml. of dimethylformamide is heated at the reflux temperature for 3 hours. Solid material precipitates during the heating period. After cooling, 300 ml. of water is added, the solid product is isolated by filtration, and washed with dilute aqueous ammonium hydroxide and water.

After slurrying the solid in dilute aqueous potassium hydroxide solution containing a small amount of ethanol to remove any di-carboxylic acid present, the solid is again isolated by filtration, washed with water and dried.

After crystallization of the product from trichlorobenzene solvent, 3 g. of a solid product having a yellowish color is obtained, M.P.=380–385° C. The product analysed as follows:

Calcd. for $C_{26}H_{16}N_4O_2$ (percent): C, 74.99; H, 3.87, N, 13.46. Found (percent): C, 75.30; H, 3.74; N, 13.45.

EXAMPLE II

Brightener evaluation (A) Polyester melt process.—To 100 grams of polyester plastic, i.e. poly(terphthalic acid ethylene glycol ester), in form of granules, are added 0.05 grams of the compound 4,4'-bis(pyrid[3,2-d]oxazol-2-yl)stilbene. The composition, which has a yellow color, is well mixed and melted at about 280° to 290° C. while stirring. This melt is then spun by conventional means into fibers from which polyester fabric may be woven. The fibers have no yellow color but have a brighter, whiter appearance than fibers spun from a melt composition containing none of the additive.

(B) Polyester chips.—Chips of the polyester (polyethylene terphthalate) containing, respectively, 4,4'-bis(pyrid[3,2-d]oxazole-2-yl)stilbene (Example 1, above) and 4,4'-bis(benzoxazol-2-yl)stilbene, a related prior art brightner, are prepared as follows. The polyester is dry-blended with 0.04% by weight of the brightener in a ball mill for 24 hours. The coated flakes are then dried in an oven for 24 hours at 212° F. The dried flakes are then placed in a cavity mold. The mold is placed in a hydraulic press heated at 575° F. and subjected to a pressure of 30 tons on a 4.5 inch diameter for 2 minutes. The brightened chips are then evaluated by comparison with a control and with each other. Measurements of whiteness are made on a Hunterlab Color and Color Difference Meter, Model D–25M equipped with a 45°–0° optical unit with circumferential illumination and direct reading whiteness module. This instrument makes precise measurements of the color of flat surfaces as they appear in day-light. Values of color are read directly from digital dials. The degree of whiteness is based on the relationship of the lightness measurement to the yellowness-blueness measurement and is expressed as:

$$W = 0.01L(L - 5.7b)$$

where
W is whiteness
L is lightness
b is yellowness-blueness

The results, set forth in Table I, show the markedly superior brightening effect produced by the compound of the invention.

TABLE I

| Additive | L | b | W | Percentage increase over whiteness control |
|---|---|---|---|---|
| 4,4'-bis(pyrid[3,2-d] oxazole-2-yl)-stilbene | 89.6 | −5.6 | 109.2 | 87 |
| 4,4'-bis(benzoxazol-2-yl)stilbene | 88.5 | −2.3 | 89.8 | 54 |
| Control (No additive) | 89.7 | 4.3 | 58.3 | |

(C) Sublimation and mark-off properties.—A 6-layer sandwich is prepared with the following layers in contact with each other.

(1) Aluminum foil
(2) Unbrightened polyester fabric
(3) Fine fiber glass fabric
(4) A polyester chip containing 0.04%, by weight of the individual brightener compound (prepared as in B, above)
(5) Unbrightened polyester fabric
(6) Aluminum foil The sanwdich is placed in a heated chamber (scorch tester) at 430° F. for 1 minute. The sublimation layer, number two, which receives brightener from the chip through the fiber glass fabric by sublimation, and the "mark-off layer," number five, which receives brightener from contact with the chip are then inspected under ultraviolet light and a visual observation is made as to transfer of brightener from the chip at the high temperature.

The results of tests conducted on the brightener of the invention and the prior art brightener, given in Table II, show the relatively low sublimation tendency of the compound of the invention.

TABLE II

| Additive | "Mark-off layer" | Sublimation layer |
|---|---|---|
| 4,4'-bis(pyrid[3,2-d] oxazole-2-yl)-stilbene | Slight | None. |
| 4,4'-bis(benzoxazol-2-yl)stilbene | Fair amount | Trace. |

While the present invention has been described herein in terms of specific embodiments and examples thereof, it is not intended that its scope be limited in any way thereby, but only as set forth in the following claims.

I claim:

1. A compound represented by the formula:

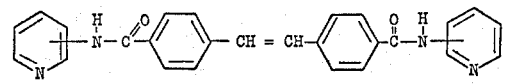

wherein each pyridine ring carries a halo or hydroxyl group in a position ortho to the point of attachment the

group and is otherwise unsubstituted or further substituted by a member selected from the group consisting of halogen, lower alkyl, carboxyl, lower carbalkoxy, carboxamido, hydroxy, cyano, lower alkoxy and phenyl; and where each phenylene ring is otherwise unsubstituted or is further substituted by a member selected from the group consisting of lower alkyl, halogen, lower carbalkoxy, carboxamido, cyano, hydroxy and lower alkoxy.

2. A compound represented by the formula:

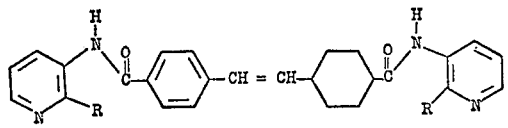

wherein R is a member selected from the group consisting of halogen and hydroxy.

References Cited

UNITED STATES PATENTS

| | | | |
|---|---|---|---|
| 2,688,617 | 9/1954 | Hein et al. | 260—249.6 |
| 2,877,218 | 3/1959 | Long et al. | 260—168 |

OTHER REFERENCES

Chemical Abstracts, vol. 73, pp. 61 to 62 (abstract no. 110912p), 1970.

JOHN D. RANDOLPH, Primary Examiner

U.S. Cl. X.R.

117—33.5 T; 252—301.2 W, 543; 260—75 N, 77.5 D, 78 R, 88.7 G, 92.8 R, 93.7, 94.9 G, 544